(12) United States Patent
Stevens et al.

(10) Patent No.: US 10,040,414 B1
(45) Date of Patent: Aug. 7, 2018

(54) DASH PANEL EXTERIOR MOUNTED PASSENGER AIRBAG

(71) Applicant: NIO USA, Inc., San Jose, CA (US)

(72) Inventors: Colin J. Stevens, San Jose, CA (US); Jeffrey D. Rupp, San Jose, CA (US); Christopher J. Eckert, San Jose, CA (US); Alan Heriberto de la Garza Tamez, Lathrop, CA (US); Jane Williams, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/459,980

(22) Filed: Mar. 15, 2017

(51) Int. Cl.
| | |
|---|---|
| *B60R 21/20* | (2011.01) |
| *B60R 21/2165* | (2011.01) |
| *B60R 21/2338* | (2011.01) |
| *B60R 21/237* | (2006.01) |
| *B60R 21/261* | (2011.01) |
| *B60R 21/0136* | (2006.01) |
| *B60R 21/01* | (2006.01) |

(52) U.S. Cl.
CPC .......... *B60R 21/20* (2013.01); *B60R 21/0136* (2013.01); *B60R 21/2165* (2013.01); *B60R 21/237* (2013.01); *B60R 21/2338* (2013.01); *B60R 21/261* (2013.01); *B60R 2021/01027* (2013.01)

(58) Field of Classification Search
CPC ............................ B60R 21/20; B60R 21/0136
USPC ......................................................... 280/732
See application file for complete search history.

(56) References Cited

U.S. PATENT DOCUMENTS

| | | | |
|---|---|---|---|
| 5,265,668 A * | 11/1993 | Fisher | B60H 1/247 165/42 |
| 6,431,583 B1 | 8/2002 | Schneider | |
| 6,962,363 B2 | 11/2005 | Wang et al. | |
| 7,070,201 B2 | 7/2006 | Song et al. | |
| 8,820,778 B2 * | 9/2014 | Fukawatase | B60R 21/205 280/728.2 |
| 9,248,799 B2 | 2/2016 | Schneider et al. | |
| 9,409,538 B2 | 2/2016 | Gorman et al. | |
| 2003/0001366 A1 * | 1/2003 | Debler | B60H 1/0055 280/732 |

FOREIGN PATENT DOCUMENTS

| | | | | |
|---|---|---|---|---|
| JP | 05254381 A | * | 10/1993 | ........... B60R 21/164 |
| JP | 2014159254 A | * | 9/2014 | |

OTHER PUBLICATIONS

U.S. Appl. No. 15/806,624, filed Nov. 8, 2017, Rupp et al.
U.S. Appl. No. 15/703,422, filed Sep. 13, 2017, Rupp.
U.S. Appl. No. 15/473,132, filed Mar. 29, 2017, Zhang et al.
U.S. Appl. No. 15/473,145, filed Mar. 29, 2017, Zhang et al.
International Search Report and Written Opinion for International Patent Application No. PCT/US18/17745, dated Mar. 19, 2018, 8 pages.

* cited by examiner

*Primary Examiner* — Faye M Fleming
(74) *Attorney, Agent, or Firm* — Sheridan Ross P.C.

(57) ABSTRACT

An airbag system is provided including an inflator mounted in a front compartment of a vehicle and a deployable or fixed chute that defines a passageway from the front compartment of the vehicle to a passenger compartment of the vehicle for an airbag cushion stored proximate the inflator to follow upon inflation of the airbag cushion.

20 Claims, 9 Drawing Sheets

DASH PANEL EXTERIOR MOUNTED
PASSENGER AIRBAG

FIELD

The present disclosure is generally directed to vehicle systems, and more particularly to vehicle airbag systems.

BACKGROUND

The inclusion of airbags in passenger vehicles has largely become standard, in many cases due to government safety regulations. Airbags have proven effective at protecting vehicle occupants from more serious injury when the occupied vehicle is involved in a crash. This is due in large part to the ability of airbags to deploy quickly, thus enabling protection of occupants even during crashes that occur at high speeds. When deployed, airbags help to prevent vehicle occupants from excessive movement within the vehicle passenger compartment and associated injuries.

Practical considerations dictate that airbag modules be mounted in close proximity to vehicle occupants, so that the airbag can quickly deploy into a space between the vehicle occupant and the vehicle structure when necessary. Front passenger airbags, for example, are commonly mounted within the instrument panel/cross car beam assembly within the passenger compartment. As another example, U.S. Pat. No. 9,409,538 (the entirety of which is hereby incorporated by reference herein) describes a heating, ventilation, and air conditioning assembly having a housing that supports the housing of an airbag module in a position immediately underneath the passenger-side dashboard. However, the mounting of airbag modules in locations immediately adjacent to the passenger compartment decreases the amount of vehicle cabin space available for use by vehicle owners and users.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Figure 1:
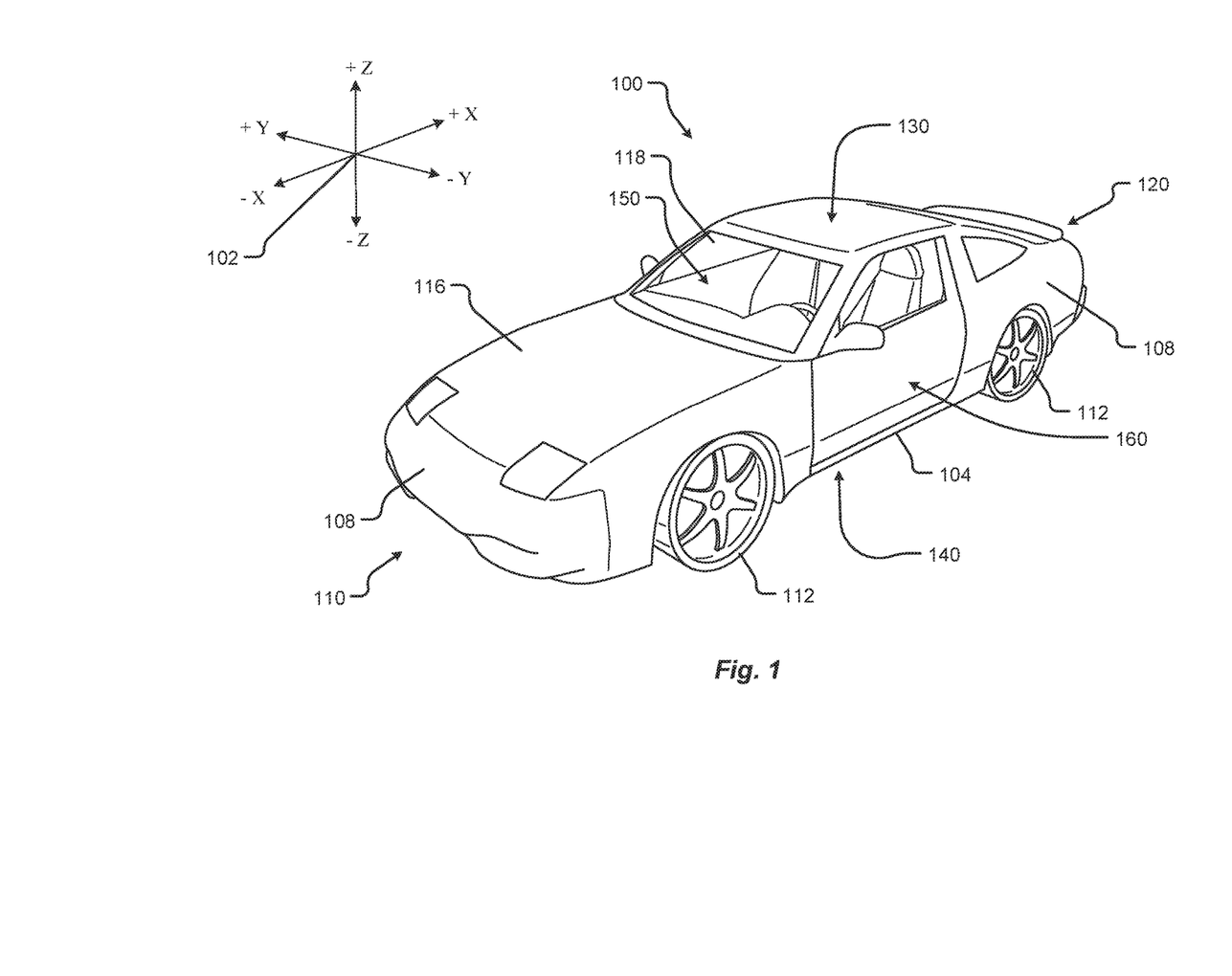
FIG. 1 shows a vehicle in accordance with embodiments of the present disclosure.

FIG. 1 shows a perspective view of a vehicle 100 in accordance with embodiments of the present disclosure. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component.

The vehicle 100 may be, by way of example only, an electric vehicle or a gas-powered vehicle. Where the vehicle 100 is an electric vehicle, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is a gas-powered vehicle, the vehicle 100 may comprise a gas-powered engine and associated components in the front compartment (under the vehicle hood 116), which engine may be configured to drive either or both of the front wheels 112 and the rear wheels 112.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

Figure 2:
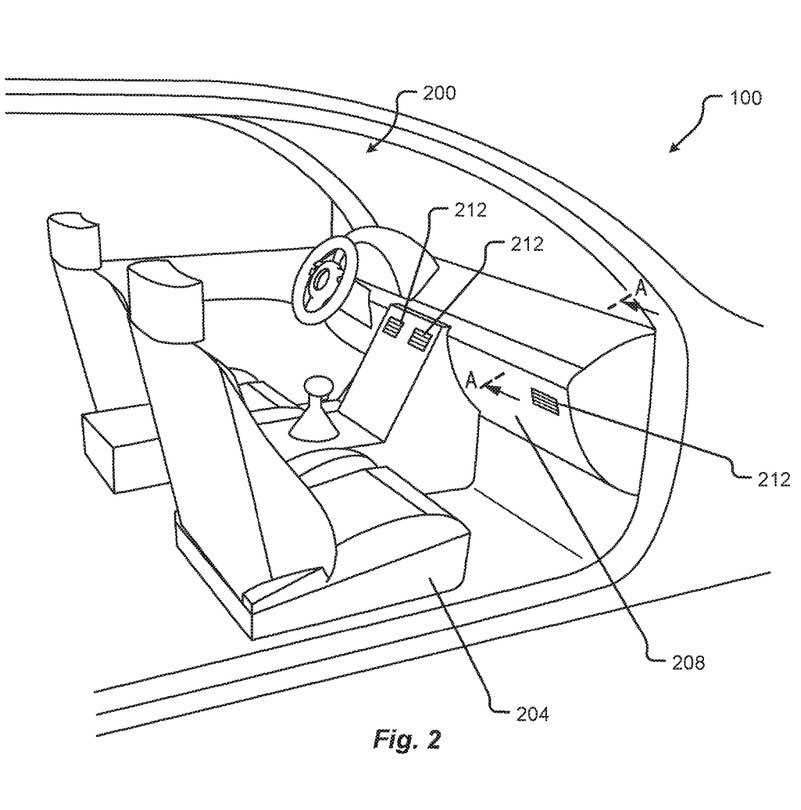
FIG. 2 shows a passenger compartment of a vehicle such as the vehicle shown in FIG. 1.

Referring now to FIG. 2, a vehicle passenger compartment 200 of a vehicle 100 according to embodiments of the present disclosure includes a passenger seat 204, and a dashboard or instrument panel or dash panel (all of which terms may be used interchangeably herein) 208. The dashboard may include one or more air registers or vents 212, through which heated, cooled, or unconditioned air may be introduced into the passenger compartment for climate control and ventilation purposes. The air vents 212 cover apertures in one or more air ducts (not shown in FIG. 2) that channel fresh or recirculated air through heating or cooling systems of the vehicle 100, as appropriate, and to the air vents 212 for introduction into the passenger compartment 200. Airbags mounted according to embodiments of the present disclosure deploy into the space in front of or surrounding the seat 204 and/or the dashboard 208.

Figure 3:
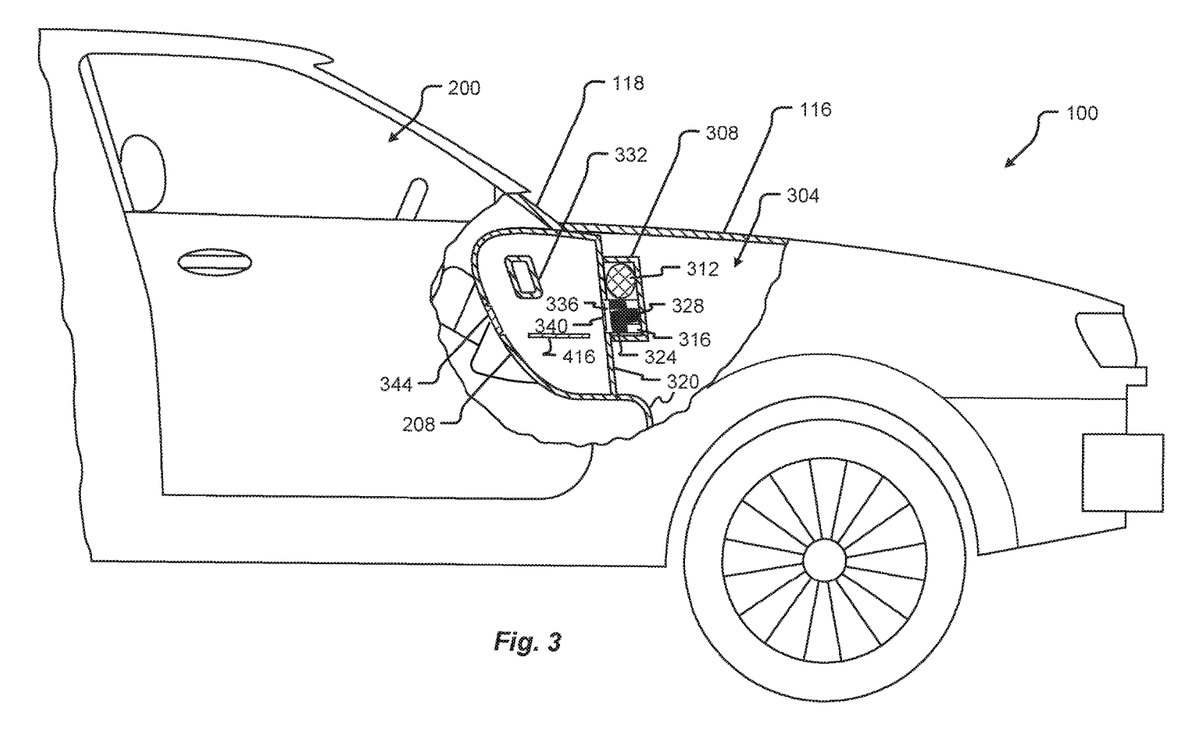
FIG. 3 shows an airbag module mounted in a front compartment of a vehicle according to one embodiment of the present disclosure.

Referring now to FIG. 3, a vehicle 100 is shown with a cutaway portion showing a sectional view (taken at roughly Line A-A of FIG. 2) of the structure between the passenger compartment 200 and a front compartment 304. An air duct 332 (which, for example, may provide air to the air vent 212) is visible, as are cross-sections of portions of the windshield 118 and the hood 116. The vehicle front compartment 304 may be, as described above with respect to FIG. 1 and by way of example only, a trunk or storage space in some embodiments, particularly but not exclusively when the vehicle in question utilizes electric propulsion (as shown here), or an engine compartment in other embodiments. The vehicle front compartment 304 may not be climate controlled. In some embodiments, the vehicle front compartment 304 may be separate and apart from the passenger compartment. An airbag module 308, comprising an inflator 312 and a cushion module 316, may be mounted to a rear wall 320 of the front compartment 304. The use of inflators in airbag modules is common, and the inflator 312 may be any type of inflator known in the art. The rear wall 320 is positioned forward of the passenger compartment 200 of the vehicle 100, and in some embodiments separates the passenger compartment 200 (including the dash panel 208 and the space between the dash panel 208 and the rear wall 320) from the front compartment 304. Among other things, disposing the airbag module 308 in a separate compartment (e.g., the vehicle front compartment 304, etc.) from the passenger compartment 200 provides additional space in the vehicle interior 150 and/or the passenger compartment 200. Another benefit to locating the airbag module in a compartment that is apart from the passenger compartment 200 includes safely containing the initiator, inflator 312, and/or other deployment means in an uninhabited, or safe, area of the vehicle 100. In this example, any non-passive failure of one or more explosive components may be safely contained in the separate compartment (e.g., vehicle front compartment 304, etc.). Unlike vehicles that include the initiator assembly and entire airbag system inside the passenger compartment 200 (e.g., in a steering wheel, dashboard, or other portion of the passenger compartment 200, etc.), the present disclosure describes embodiments including the physical separation of the entire airbag initiator assembly and/or airbag module 308 from the passenger compartment 200, dashboard, interior panel, steering wheel, etc. This physical separation offers a multitude of benefits including the increase in available passenger compartment 200 space and passenger, operator, or vehicle user safety while inside the passenger compartment 200 by locating the initiator or inflator 312 outside of the passenger inhabited area (e.g. the passenger compartment 200).

In some embodiments, the airbag module 308 or portions thereof may be mounted to a structure or element of the vehicle 100 or a component thereof other than the rear wall 320. Also in some embodiments, including embodiments illustrated herein, the rear wall 320 separates the front compartment 304 from the passenger compartment 200, and the various components and elements between the rear wall 320 and the dash panel 208 are considered to be within the passenger compartment 200. The rear wall 320 and dash panel 208 may be the same structure, parts of the same structure, or different structures. Additionally, each of the rear wall 320 and the dash panel 208 may comprise a single integral structure or a structure formed of a plurality of assembled or otherwise connected elements.

The cushion module 316 includes a deployable chute 324 and a folded, inflatable cushion 328. Although referred to herein as a "folded" cushion 328, the cushion 328 may be stowed in any manner known in the art to ensure proper inflation thereof at the appropriate time. The air bag module 308 may also comprise a crash sensor for detecting collisions and triggering the inflator 312 and a diagnostic monitoring unit for periodically determining whether the airbag module 308 remains operational. These components, which are not depicted in FIG. 3, may be the same as or similar to crash sensors and diagnostic monitoring units known in the art.

The deployable chute 324, which may also be referred to as a capsule or container, is configured to contain the folded, inflatable cushion 328 in a stowed position during normal operation of the vehicle 100, and to guide the cushion 328 from its normal stowed position toward the passenger compartment 200 when the inflator 312 is ignited or triggered. By way of example but not limitation, the chute 324 may have, for example, collapsible, foldable, or telescoping walls, and may be configured to extend, for example, in an accordion or telescoping fashion from a stowed position to a deployed position. The deployable cushion may comprise a stiff wall, a flexible wall, or a combination of both.

Extension of the deployable chute 324 may result, for example, from a chemical reaction in or initiated by the inflator 312, which chemical reaction may propel the chute 324 (or at least one end thereof) toward the passenger compartment 200. In some embodiments, the chemical reaction may rapidly generate a gas, which gas may flow into the chute 324 and around the folded cushion 328, and cause an end of the chute 324 to extend toward the passenger compartment 200 (thus extending the walls of the chute 324 from a collapsed position to an extended position). In other embodiments, gas generated by a chemical reaction in or initiated by the inflator 312 may push the folded cushion 328 toward the passenger compartment 200, which pushing action may cause the chute 324 to extend. In still other embodiments, the chute 324 may have inflatable walls, such that gas generated by a chemical reaction in or initiated by the inflator 312 inflates the walls of the chute 324, causing the chute 324 to extend toward the passenger compartment 200 and into position. Although the foregoing discussion refers to a chemical reaction in or initiated by the inflator 312, other means of deploying the chute 324 are also within the scope of the present disclosure, including the use of a compressed gas stored in a tank that comprises part of the inflator 312, and the use of a motorized or other mechanical mechanism that extends the chute 324.

The dash panel 208 may comprise a dash trim panel 344 (which may be integral with or separate from but attached to the dash panel 208) surrounded at least partially by a tear seam or line of weakness, or otherwise configured to break away or move out of the way when the airbag cushion 328 deploys. Such a tear seam or line of weakness may be the result of laser perforating around some or all of the dash trim panel 344, the use of relatively weak (compared to the strength of the material out of which the dash panel 208 and the dash trim panel 344 are made) stitching or adhesive to attach the dash trim panel 344 to the dash panel 208, the use of skiving to generate a thin line of thinner material around some or all of the dash trim panel 344, or by molding the dash panel 208 and dash trim panel 344 with a relatively thinner (compared to the thickness of the dash panel 208 and the dash trim panel 344) line of material holding the dash trim panel 344 to the dash panel 208. In some embodiments, the dash trim panel 344 may be hingedly connected to the dash panel 208, and configured to rotate about an axis of the hinge(s) used to connect the dash trim panel 344 to the dash panel 208 and out of the way of the deploying cushion 328. Hinges used in such embodiments may be living hinges or any other known hinge that will allow the dash trim panel 344 to be displaced by the deploying cushion 328. Also, hinged embodiments may include a biasing member to bias the dash trim panel 344 into a closed position, provided that the biasing member does not disadvantageously impede deployment of the cushion 328 when the inflator 312 is ignited or otherwise triggered.

The foregoing examples are not intended to limit the present disclosure. Any means described herein or otherwise known in the art may be used to create the tear seam or line of weakness, or to otherwise facilitate the breaking away or displacement of the dash trim panel 344 upon deployment of the airbag cushion 328.

In some embodiments, including the embodiment pictured in FIG. 3, the rear wall 320 may be equipped with a noise isolation cover 340 that blocks an opening 336 in the rear wall 320 during normal operation of the vehicle 100, but that can easily be broken away, pushed, or otherwise moved out of the way upon deployment of the deployable chute 324. For example, like the dash trim panel 344, the noise isolation cover 340 may be surrounded in whole or in part by a tear seam or other line of weakness that allows the noise isolation cover 324 to be easily detached from the rear wall 320 upon deployment of the deployable chute 324. As another example, the noise isolation cover 340 may comprise a hinged door that opens when pushed by the deploying deployable chute 324. In embodiments using a hinged noise isolation cover 340, the noise isolation cover 340 may be biased to the closed position by a spring or other resilient or elastic member to ensure that the noise isolation cover 340 remains in the closed position during normal operation of the vehicle 100, provided that the biasing member does not exert so strong a biasing force that it disadvantageously impedes deployment of the deployable chute 324. As with the dash trim panel 344, any means or mechanism known in the art or described herein may be used to create a tear seam or line of weakness or to otherwise facilitate the breaking away or moving out of the way of the noise isolation cover 340 upon deployment of the airbag cushion 328.

Figure 4:
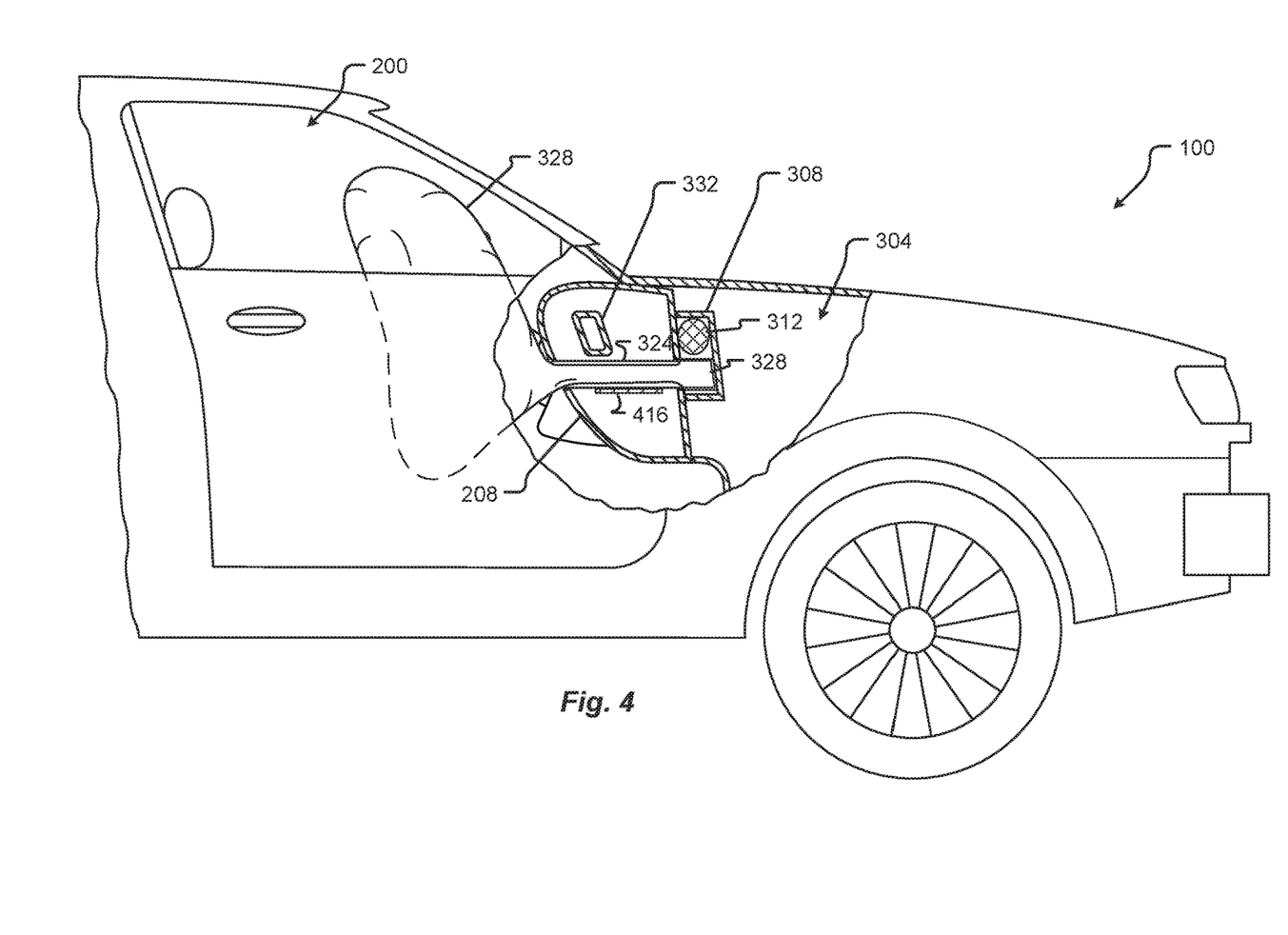
FIG. 4 shows the airbag module of FIG. 3 in a deployed state.

Referring now to FIGS. 3 and 4, when the inflator 312 of the airbag module 308 is ignited or otherwise triggered (e.g., in response to a detected collision of the vehicle 100), the deployable chute 324 containing the folded cushion 328 deploys through the opening 336 in the rear wall 320 (thus detaching or opening any noise isolation cover 340 located in such opening 336) through any interior space or structure between the rear wall 320 and the dash panel 208. Once the deployable chute 324 is in position, the cushion 328 (which travels rearwardly from the airbag module 308 to the dash panel 208 either with the extending chute 324 or after the chute 324 has deployed) emerges from the deployable chute 324, breaks through or displaces the dash trim panel 412, emerges into position within the passenger compartment 200 and inflates to full volume.

A guide structure 416 may be included in some embodiments to ensure that the deployable chute 324 deploys along the proper path, to ensure that the deployment path of the deployable chute 324 is unobstructed, and/or to protect the airbag from damage such as snagging or tearing. The guide structure 416 may comprise a single element, as depicted in FIGS. 3 and 4, or multiple elements. The guide structure 416 may be provided along the entire length of the deployment path of the chute 324, or only along a portion of the deployment path of the chute 324. The guide structure 416 may be a tube or duct through which the chute 324 extends and deploys, or the guide structure 416 may comprise one or more surfaces to support the chute 324 in one or more directions. The guide structure 416 may comprise, for example, one or more plates, rails, surfaces, grids, and/or meshes. For example, the guide structure 416 depicted in FIG. 3 comprises a plate structure placed along the bottom of a portion of the deployment path of the chute 324, and serves to support the chute 324 and prevent the chute 324 from bending or otherwise traveling or falling downward during deployment thereof (or during deployment of the airbag cushion 328). In other embodiments, the guide structure 416 may be placed along the bottom of the chute 324 deployment path, along one or more sides of the chute 324 deployment path, and/or along the top of the chute 324 deployment path.

In some embodiments, the chute 324 and/or the cushion 328 may be required to break through or displace not just a dash trim panel 344 and/or a noise isolation cover 340, but additional structural or non-structural elements located in, around, between, or near the rear wall 320 and the dash panel 208. For example, the dash panel 208 may comprise an underlying structural portion (manufactured, for example, from one or more plastics or metals) and an overlaid aesthetic portion (manufactured, for example, from leather). Other elements may also occupy the space through which the deployable chute 324 and/or the cushion 328 must deploy to reach the passenger compartment 200 from the airbag module 308. As with the dash trim panel 344 and the noise isolation cover 340, such elements may be configured with a panel, cover, flap, door, or other structure or mechanism that facilitates the breaking away or the moving out of the way of the element (or at least a portion thereof) upon deployment of the chute 324 and/or the airbag cushion 328.

The cushion module 316 may be configured to operate in one or multiple stages. In one embodiment, for example, the inflator 312 may house or cause a chemical reaction that causes the folded cushion 328 to begin to inflate. The folded cushion 328 may comprise a tube portion connecting the main body of the cushion 328 to the inflator 312, which tube may inflate first and simultaneously push the main body of the cushion 328 toward the passenger compartment 200, thus pushing the chute 324 into a deployed position. In another embodiment, the inflator 312 may cause the chute 324 to deploy first, after which gas generated by or at the inflator 312 may begin to inflate the cushion 328. In some embodiments, the chute 324 may comprise an extendable end that is tethered to a valve, such that when the chute 324 is fully extended, the tether opens the valve, which diverts gas into the cushion 328 for inflation thereof.

Figure 5:
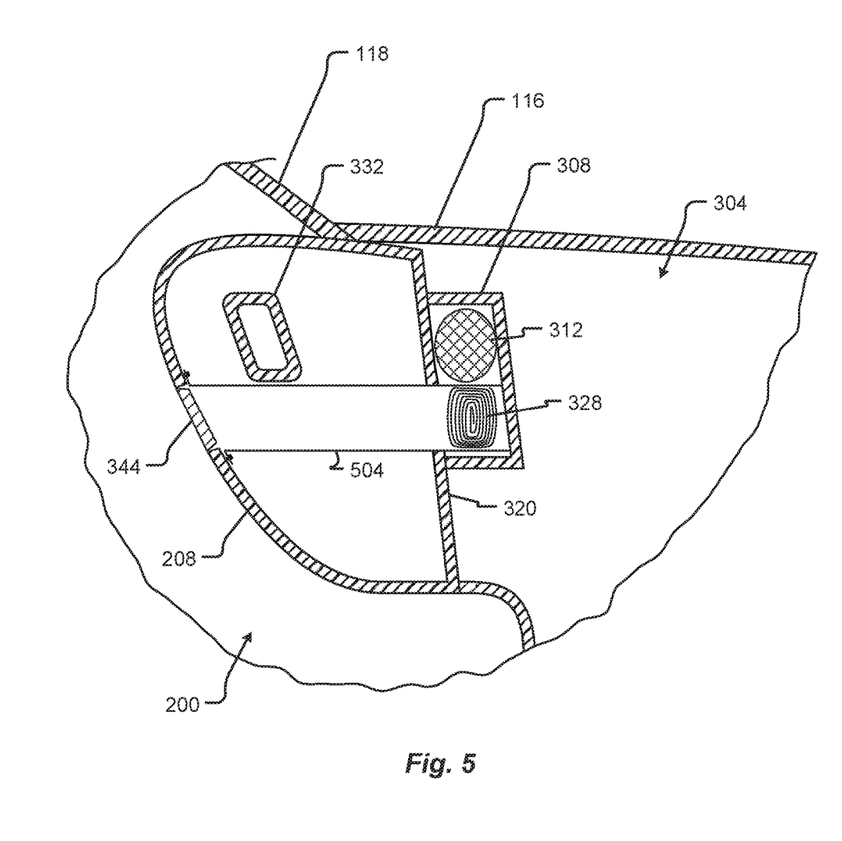
FIG. 5 shows an airbag module mounted in a front compartment of a vehicle according to another embodiment of the present disclosure.

FIGS. 5-8 show only relevant portions of the vehicle 100 for the present disclosure, while other portions of the vehicle 100 are excluded to avoid unnecessary complexity. FIG. 5 depicts an embodiment according to another aspect of the present disclosure, in which an airbag inflator 312 may be mounted to the rear wall 320, while a folded cushion 328 may be contained within a fixed chute 504 that passes through an opening in the rear wall 320 and terminates adjacent the dash trim panel 344. The fixed chute 504 may be attached to the dash panel 208 in some embodiments, as shown in FIG. 5, while in other embodiments the fixed chute 504 may be held in place by attachment to the rear wall 320 and/or to other structural members of the vehicle 100 or of components of the vehicle 100.

In some embodiments, the fixed chute 504 may be a solid-walled duct or tube extending along the entire path from the airbag module 308 to the dash panel 208. In other embodiments, the fixed chute 504 may comprise a duct or tube with one or more apertures in the wall thereof to reduce material/part cost and/or weight. In still other embodiments, the fixed chute 504 may be fashioned from a mesh or web, such that the chute 504 fulfils its function of guiding the cushion 328 from the airbag module 328 toward the passenger compartment 200 but with a reduced amount of material compared to a solid-walled duct or tube. Additionally, in still other embodiments the chute 504 may be fashioned from a plurality of rails, plates, or other structural members that collectively guide the cushion 328 toward the passenger compartment 200 during deployment. Further, the fixed chute 504 may not extend all the way to the dash panel 208. In some embodiments, for example, the fixed chute 504 may extend only as far as the air duct 332, or only as far as necessary to provide the cushion 328 with a trajectory that will intersect the dash trim panel 344.

In the embodiment of FIG. 5, when the inflator 312 is ignited or otherwise triggered, the cushion 328 is propelled along the fixed chute 504. The cushion 328 then passes through the dash trim panel 344 using conventional means (which may include, for example, breaking away or otherwise displacing the dash trim panel 344, as discussed above) and inflates to a fully deployed, or full volume, within the passenger compartment 200.

Figure 6A:
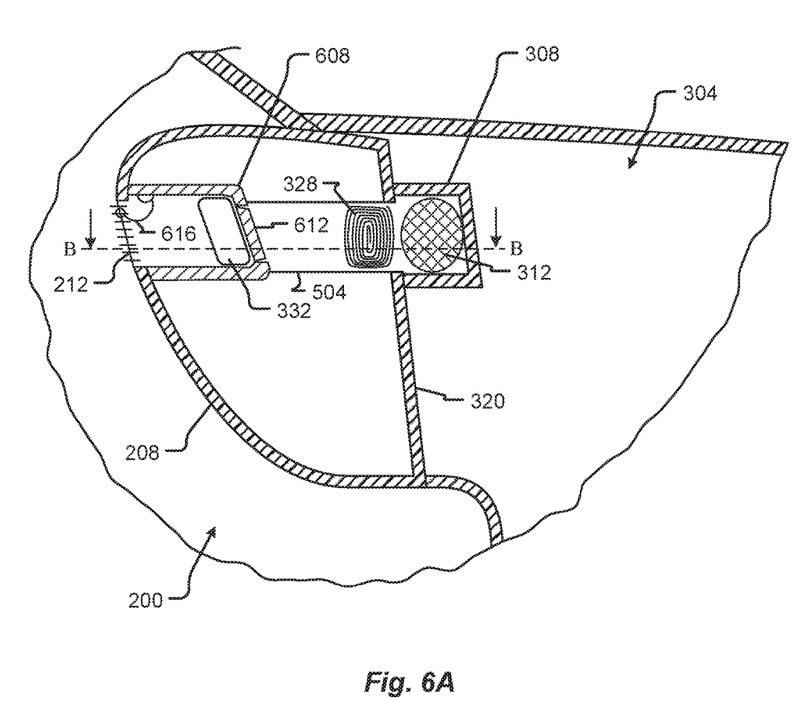
FIG. 6A shows an airbag module mounted in a front compartment of a vehicle according to yet another embodiment of the present disclosure.
Figure 6B:
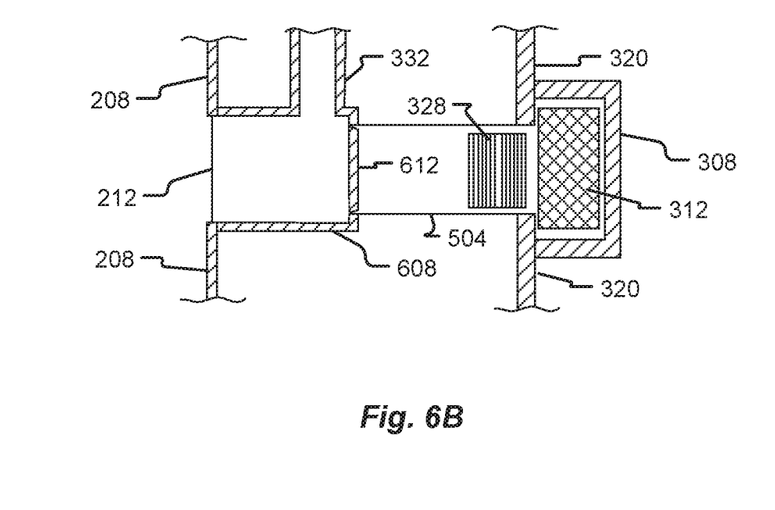
FIG. 6B shows a sectional view of a portion of the structure depicted in FIG. 6A.

Referring now to FIGS. 6A and 6B, in yet another aspect of the present disclosure, an airbag module 308 comprising an inflator 312 may be mounted to the rear wall 320 of the front compartment 304 of a vehicle 100, while a folded cushion 328 may be contained within a fixed chute 504 that passes through an opening in the rear wall 320, as in the embodiment of FIG. 5. FIG. 6B shows a sectional view of the airbag module 308, the chute 504, the air duct 608, and the air duct 332, taken along line B-B. Disposing the folded cushion 328 at least partially within the fixed chute 504 advantageously reduces the amount of time necessary for the cushion 328 to travel through the chute 504 to the passenger compartment 200 upon deployment. As noted previously, disposing the initiator, or inflator 312 in the front compartment 304 rather than in the passenger compartment 200 beneficially increases the amount of available space in the passenger compartment while enhancing safety by separating the initiator or inflator 312 from the passenger compartment. Unlike the embodiment of FIG. 5, however, the fixed chute 504 of the present embodiment is at least partially supported by and terminates at an air duct 608 of the heating, ventilation, and air conditioning (HVAC) system of the vehicle 100. The air duct 608, which receives air from the air duct 332, terminates at an air vent 212 in the dash panel 208, which air vent is removable or otherwise displaceable and is tethered to the air duct 608 with a tether 616. In other embodiments, the air vent 212 may be tethered to the dash panel 208 or to some other available structural member. Also in some embodiments, the air vent 212 may be hingedly connected to the dash panel 208 rather than tethered to the dash panel 208, the air duct 608, or another available structural member.

When the inflator 312 of the present embodiment is ignited or otherwise triggered, the cushion 328 is propelled through the chute 504 and breaks or otherwise passes through a wall 612 of the air duct 608. The air duct 608 may be provided with a tear seam, a displaceable cover, or other means for facilitating the passage of the cushion 328 through the wall 612 of the air duct 608. Once the cushion 328 enters the air duct 608, the cushion 328 is propelled (or inflates) along the air duct 608 until the cushion 328 reaches the air vent 212. The cushion 328 then pushes the air vent 212 out of the dashboard 208 (or otherwise displaces the air vent 212), and thus reaches the passenger compartment 200. Because the air vent 212 is tethered to the air duct 608 with the tether 616, the air vent 212 is prevented from flying through the passenger compartment 200 and possibly striking a passenger of the vehicle 100 when the air cushion 328 deploys. Upon reaching the passenger compartment 200, the cushion 328 inflates to full volume.

Although in FIGS. 6A and 6B the inflator 312 is depicted in a position forward of the rear wall 320 and the cushion 328 is depicted in a position rearward of the rear wall 320, the present disclosure encompasses alternative embodiments in which the inflator 312 and cushion 328 are both forward of the rear wall 320. Additionally, regardless of whether the cushion 328 is forward or rearward of the rear wall 320, a noise isolation cover may be positioned within the fixed chute 504, whether in line with the rear wall 320 or between the cushion 328 and the wall 612. The noise isolation cover may be the same as or similar to the noise isolation cover 340 discussed above, or it may be simply a breakable barrier (e.g., a plastic membrane, or a paper or paperboard plug).

Figure 7:
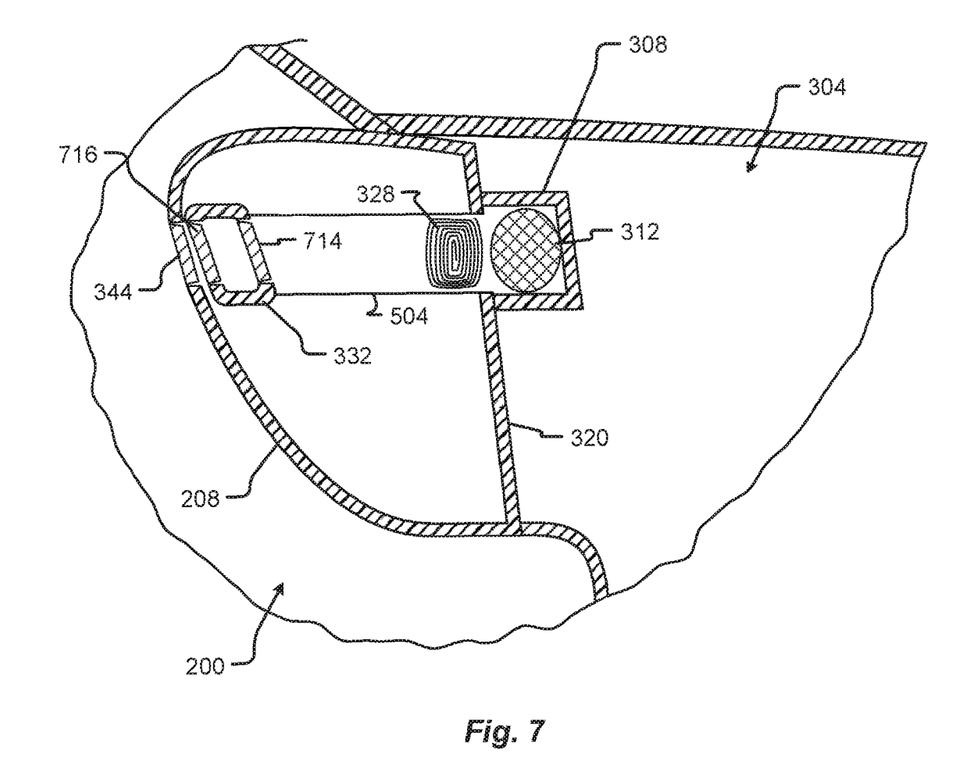
FIG. 7 shows an airbag module mounted in a front compartment of a vehicle according to still another embodiment of the present disclosure.

Referring now to FIG. 7, in another embodiment according to the present disclosure, an airbag inflator 312 may be mounted to the rear wall 320 of a vehicle 100, while a folded cushion 328 may be contained within a fixed chute 504 that passes through an opening in the rear wall 320, as in the embodiment of FIGS. 5 and 6. Here again, the disposition of the inflator 312 outside of the passenger compartment 200 increases the amount of unoccupied space in the passenger compartment 200, while protecting occupants of the vehicle 100 by separating the passenger compartment from the initiator or inflator 312 (which, when ignited or otherwise triggered, may utilize an explosion or other chemical reaction to inflate the cushion 328, which explosion or other chemical reaction may be dangerous to vehicle occupants) by the rear wall 320. The fixed chute 504 of the present embodiment is at least partially supported by and terminates at an air duct 332 of the vehicle 100. However, the fixed chute 504 does not align with the air duct 332 so as to channel the cushion 328 along the air duct 332 towards an air vent 212, as in the embodiment of FIG. 6. Instead, fixed chute 504 directs the cushion 328 along a path more or less perpendicular to the air duct 332, such that the cushion 328 must pass completely through the air duct 332 during deployment. Thus, the air duct 332 of the embodiment of FIG. 7 comprises two wall portions—a first wall portion 714 adjacent the rearward end of the fixed chute 504, and a second wall portion 716 generally opposite the first wall portion 714—that are completely or partially surrounded by tear seams or lines of weakness or are otherwise displaceable, as described elsewhere herein. The dash trim panel 344 adjacent the second wall portion 716 is also completely or partially surrounded by a tear seam or line of weakness or is otherwise displaceable.

When the inflator 312 of the embodiment of FIG. 7 ignites or is otherwise triggered, the cushion 328 is propelled out of the fixed chute 504 and breaks through or otherwise displaces the first and second wall portions 714 and 716 of the air duct 608. The cushion 328 also passes through the dash trim panel 344. Upon entering the passenger compartment 200, the cushion 328 inflates to full volume.

The principles of the embodiment of FIG. 7 may be applied with respect to other structural members that lie between the airbag module 308 and the passenger compartment 200. More specifically, each structural member (or non-structural component) within the deployment path of the cushion 328 may comprise a breakaway or moveable portion completely or partially surrounded by a tear seam or line of weakness, or that is otherwise rendered displaceable. During normal operation of the vehicle 100, these breakaway or moveable portions remain in place. However, when the inflator 312 ignites or is otherwise triggered, the cushion 328 can dislodge the breakaway or moveable portions to reach the passenger compartment 200.

Figure 8:
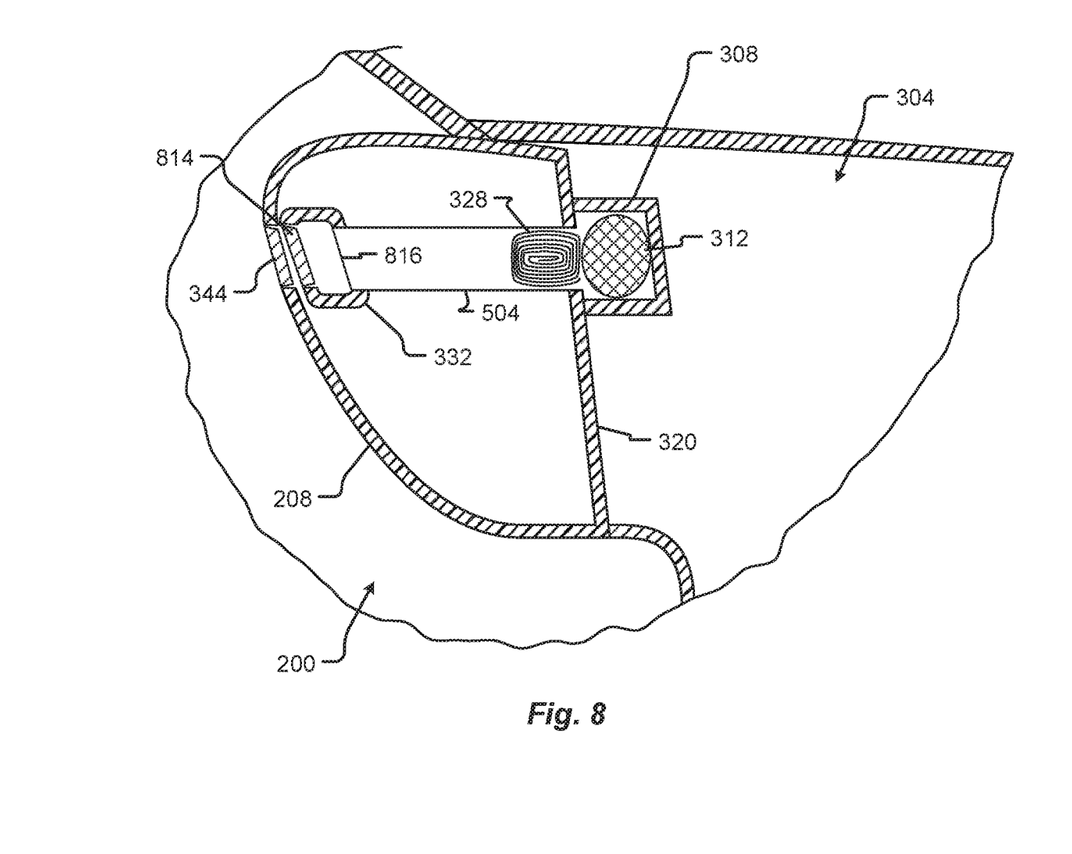
FIG. 8 shows an airbag module mounted in a front compartment of a vehicle according to a further embodiment of the present disclosure.

Referring now to FIG. 8, in still another embodiment according to the present disclosure, an airbag inflator 312 may be mounted to the rear wall 320 of the front compartment 304 of a vehicle 100, while a folded cushion 328 may be contained within a fixed chute 504 that passes through or originates at an opening in the rear wall 320. The benefits of this arrangement are similar to those described above with respect to FIGS. 6 and 7. The fixed chute 504 of this embodiment uses one or more air ducts 332, running across the deployment path of the cushion 328, for at least partial support. Additionally, the fixed chute 504 of this embodiment terminates inside the air duct 332. A portion 814 of the wall of the air duct 332, located opposite the end of the fixed chute 504, is completely or partially surrounded by a tear seam or a line of weakness or is otherwise displaceable, as is an adjacent dash trim panel 344. Any of the means or mechanisms described herein for rendering a panel or door breakable or otherwise displaceable may be used in connection with the wall portion 814 and the dash trim panel 344.

When the inflator 312 of the embodiment of FIG. 8 ignites or is otherwise triggered, the cushion 328 is propelled along and out of the fixed chute 504, after which it breaks or otherwise passes through the portion 814 of the wall of the air duct 332 and also through the dash trim panel 344. Upon entering the passenger compartment 200, the cushion 328 inflates to full volume. Because the fixed chute 504 terminates inside the air duct 332, the cushion 328 need not break through both sides of the air duct 332, and therefore may arrive at the passenger compartment 200 more quickly than if it did need to break through both sides of the air duct 332.

In some embodiments, the fixed chute 504 may be equipped with a door, a shroud, or some other removable or displaceable cover 816. The cover may be integral with the fixed chute 504 and defined by a tear seam or other line of weakness, or the cover may be a separate piece that is attached or otherwise affixed to the fixed chute 504, whether by one or more hinges, by a press-fit connection, with an adhesive, or otherwise. In some embodiments, the cover 816 may be a plastic membrane, or a paper or paperboard plug. The cover 816 may serve to prevent air flowing through the air duct 332 from entering the fixed chute 504. The cover 816 may additionally or alternatively serve to contain the cushion 328 within the fixed chute 504, or to provide additional noise isolation (particularly where the front compartment 304 is an engine compartment).

With reference still to the embodiment of FIG. 8, the cushion 328 is shown at a forward position within the fixed chute 504. However, the cushion 328 may be positioned at the rearward end of the fixed chute 504, i.e. the end that terminates inside the air duct 332, thus effectively blocking the fixed chute 504 to air flow to minimize the effect of fixed chute 504 on air flow through the air duct 332. Such positioning of the cushion 328 within the fixed chute 504 may render a cover 816 unnecessary. As another alternative, the cushion 328 may be located within the airbag module 308 on the forward side of the rear wall 320 of the front compartment 304 of the vehicle 100, and a cover, door, or plug such as the cover 816 or the noise isolation cover 340 may be positioned within the fixed chute and in line with the rear wall 320, or between the rear wall 320 and the air duct 332.

The chutes 324 and 504 described herein may have one or more purposes, including to provide a guide path from the stored position of the airbag cushion 328 to or towards the passenger compartment 200; to support the airbag cushion 328 as it travels to or toward the passenger compartment 200; to protect the airbag cushion 328 from being punctured by vehicle components positioned between the rear wall 320 and the dash panel 208, especially vehicle components that are pushed towards or into the deployment path of the cushion 328 by the forces of an accident or crash that causes the airbag cushion 328 to deploy; and to enable the airbag cushion 328 to travel more quickly from its stored position to its deployed position. The chute 324 or 524 may be lubricated internally in furtherance of the latter purpose.

Although the embodiments described herein picture the inflator 312 mounted to the rear wall 320, in other embodiments the inflator 312 may be mounted to other components or elements of the vehicle 100 that are positioned proximal to the rear wall 320 and in the front compartment 304.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation to the installation of an airbag module in a vehicle. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments include a vehicle, comprising: a passenger compartment; a front compartment forward of the passenger compartment; a dividing structure separating the passenger compartment from the front compartment, the dividing structure comprising a dash panel facing the passenger compartment and a wall facing the front compartment; an airbag module mounted on the wall in the front compartment, the airbag module comprising an inflator and a cushion module, wherein the cushion module comprises a deployable chute containing an airbag cushion.

Aspects of the above vehicle include: a deployable chute deploys when the inflator is triggered; the deployable chute, when deployed, provides a guide path for the airbag cushion from the airbag module toward the dash panel; the deployable chute comprises a folding wall, a telescoping wall, or an inflatable wall; the wall comprises a noise isolation cover, and the deployable chute displaces the noise isolation cover when deployed; the noise isolation cover is at least partially surrounded by a tear seam or line of weakness; the airbag cushion pushes the deployable chute into a deployed position when the inflator is triggered; the airbag cushion, when fully inflated, comprises a tube portion extending from the airbag module through the deployable chute to the passenger compartment, and a main portion that fills a volume of the passenger compartment; and a guide structure between the wall and the dash panel, the guide structure positioned to aid proper deployment of the deployable chute.

Embodiments also include an airbag assembly comprising: an inflator mounted on a rear wall of a front compartment of a vehicle, the front compartment positioned forward of a passenger compartment of the vehicle; a chute extending from the rear wall toward the passenger compartment, the chute having a first end proximate the rear wall and a second end distal from the rear wall; an airbag cushion positioned near the first end of the chute and deployable from a stowed state to an inflated state upon operation of the inflator, wherein at least a portion of the airbag cushion passes through the chute and into the passenger compartment upon operation of the inflator.

Aspects of the above airbag assembly include: a dash panel separates the rear wall from the passenger compartment, the dash panel comprising a first displaceable portion aligned with the chute and configured to be displaced by the airbag cushion upon operation of the inflator; the second end of the chute is positioned proximate the dash panel; the second end of the chute is positioned proximate a forward side of an air duct, the air duct located between the rear wall and the dash panel; the forward side of the air duct comprises a second displaceable portion aligned with the chute and configured to be displaced by the airbag cushion upon operation of the inflator; a rearward side of the air duct comprises a third displaceable portion aligned with the chute and configured to be displaced by the airbag cushion upon operation of the inflator; at least one of the first displaceable portion, the second displaceable portion, and the third displaceable portion is at least partially surrounded by a tear seam or line of weakness; and at least one of the first displaceable portion, the second displaceable portion, and the third displaceable portion is moveably connected to an adjacent structural member.

Embodiments further include an airbag system comprising: an inflator mounted in a first vehicle compartment, the first vehicle compartment separated from a second vehicle compartment by at least a dash panel and a wall, the dash panel located between the wall and the second vehicle compartment, wherein the dash panel comprises at least one removeable air vent mounted therein; a chute extending from proximate the inflator toward the air vent; and an inflatable airbag cushion positioned proximate the inflator and configured so that at least a portion of the airbag cushion passes through the chute and expands into the second vehicle compartment upon inflation of the airbag cushion.

Aspects of the above airbag system include: the at least one removeable air vent is tethered to an adjacent structure, and the airbag cushion pushes the at least one removeable air vent out of the dash panel upon inflation of the airbag cushion; and the chute is aligned with an air duct that channels air toward the air vent, the air duct comprises a displaceable wall portion, and the airbag cushion is configured to displace the displaceable wall portion upon inflation of the airbag cushion.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:
1. A vehicle, comprising:
a passenger compartment;
a front compartment forward of the passenger compartment;
a dividing structure separating the passenger compartment from the front compartment, the dividing struc- ture comprising a dash panel facing the passenger compartment and a wall facing the front compartment; and an airbag module mounted on the wall in the front compartment, the airbag module comprising an inflator and a cushion module, wherein the cushion module comprises a deployable chute containing an airbag cushion;

wherein the airbag cushion, when fully inflated, comprises a tube portion extending from the airbag module through the deployable chute to the passenger compartment, and a main portion that fills a volume of the passenger compartment.

2. The vehicle of claim 1, wherein the deployable chute deploys when the inflator is triggered.

3. The vehicle of claim 1, wherein the deployable chute, when deployed, provides a guide path for the airbag cushion from the airbag module toward the dash panel.

4. The vehicle of claim 1, wherein the deployable chute comprises a folding wall, a telescoping wall, or an inflatable wall.

5. The vehicle of claim 1, wherein the wall comprises a noise isolation cover, and further wherein the deployable chute displaces the noise isolation cover when deployed.

6. The vehicle of claim 5, wherein the noise isolation cover is at least partially surrounded by a tear seam or line of weakness.

7. The vehicle of claim 1, wherein the airbag cushion pushes the deployable chute into a deployed position when the inflator is triggered.

8. The vehicle of claim 1, further comprising a guide structure between the wall and the dash panel, the guide structure positioned to aid proper deployment of the deployable chute.

9. An airbag assembly comprising:
an inflator mounted on a rear wall of a front compartment of a vehicle, the front compartment positioned forward of a passenger compartment of the vehicle;
a chute extending from the rear wall toward the passenger compartment, the chute having a first end proximate the rear wall and a second end distal from the rear wall; and
an airbag cushion positioned near the first end of the chute and deployable from a stowed state to an inflated state upon operation of the inflator,
wherein at least a portion of the airbag cushion passes through the chute and into the passenger compartment upon operation of the inflator,
wherein a dash panel separates the rear wall from the passenger compartment, the dash panel comprising a first displaceable portion aligned with the chute and configured to be displaced by the airbag cushion upon operation of the inflator, and
wherein the second end of the chute is positioned proximate a forward side of an air duct, the air duct located between the rear wall and the dash panel.

10. The airbag assembly of claim 9, wherein the second end of the chute is positioned proximate the dash panel.

11. The airbag assembly of claim 9, wherein the forward side of the air duct comprises a second displaceable portion aligned with the chute and configured to be displaced by the airbag cushion upon operation of the inflator.

12. The airbag assembly of claim 11, wherein a rearward side of the air duct comprises a third displaceable portion aligned with the chute and configured to be displaced by the airbag cushion upon operation of the inflator.

13. The airbag assembly of claim 12, wherein at least one of the first displaceable portion, the second displaceable portion, and the third displaceable portion is at least partially surrounded by a tear seam or line of weakness.

14. The airbag assembly of claim 12, wherein at least one of the first displaceable portion, the second displaceable portion, and the third displaceable portion is moveably connected to an adjacent structural member.

15. The airbag assembly of claim 9, wherein the air duct is positioned to channel air toward an air vent disposed in the dash panel, wherein the air vent is removably connected to the air duct at a point proximate the dash panel.

16. The airbag assembly of claim 15, wherein the airbag cushion pushes the air vent out of the dash panel upon inflation of the airbag cushion.

17. The airbag assembly of claim 16, wherein the air vent is tethered to the air duct or the dash panel.

18. An airbag system comprising:
an inflator mounted in a first vehicle compartment, the first vehicle compartment being separated from a second vehicle compartment by at least a dash panel and a wall, the dash panel located between the wall and the second vehicle compartment, wherein the dash panel comprises at least one removeable air vent mounted therein;
a chute extending from proximate the inflator toward the air vent; and
an inflatable airbag cushion positioned proximate the inflator and configured so that at least a portion of the airbag cushion passes through the chute and expands into the second vehicle compartment upon inflation of the airbag cushion.

19. The airbag system of claim 18, wherein the at least one removeable air vent is tethered to an adjacent structure, and further wherein the airbag cushion pushes the at least one removeable air vent out of the dash panel upon inflation of the airbag cushion.

20. The airbag system of claim 18, wherein the chute is aligned with an air duct that channels air toward the air vent, the air duct comprises a displaceable wall portion, and the airbag cushion is configured to displace the displaceable wall portion upon inflation of the airbag cushion.

* * * * *